United States Patent
Heinzmann et al.

(10) Patent No.: US 11,685,060 B2
(45) Date of Patent: Jun. 27, 2023

(54) METHOD FOR GRIPPING AN OBJECT AND SUCTION GRIPPER

(71) Applicant: J. Schmalz GmbH, Glatten (DE)

(72) Inventors: Bernd Heinzmann, Lußburg (DE); Matthias Frey, Sulz-Dürrenmettstetten (DE); Simon Eisele, Glatten (DE); Aline Defranceski, Horb (DE)

(73) Assignee: J. Schmalz GmbH, Glatten (DE)

( * ) Notice: Subject to any disclaimer, the term of this patent is extended or adjusted under 35 U.S.C. 154(b) by 345 days.

(21) Appl. No.: 17/132,239

(22) Filed: Dec. 23, 2020

(65) Prior Publication Data
US 2021/0213626 A1 Jul. 15, 2021

(30) Foreign Application Priority Data
Jan. 13, 2020 (DE) .................... 10 2020 100 568.7

(51) Int. Cl.
*B25J 15/06* (2006.01)
*B25J 9/16* (2006.01)

(52) U.S. Cl.
CPC ......... *B25J 15/0683* (2013.01); *B25J 9/1697* (2013.01)

(58) Field of Classification Search
CPC ........ B25J 9/1697; B25J 13/08; B25J 13/087; B25J 15/0683; B66C 1/0231
See application file for complete search history.

(56) References Cited

U.S. PATENT DOCUMENTS

| | | | | |
|---|---|---|---|---|
| 3,005,652 A | * | 10/1961 | Helm | B66C 1/0212 294/189 |
| 3,174,789 A | | 3/1965 | Scherr | |
| 3,656,794 A | * | 4/1972 | McCord | B65B 35/18 D7/688 |
| 3,901,502 A | * | 8/1975 | Vits | B65H 3/0883 271/106 |
| 4,582,353 A | | 4/1986 | Alvernhe | |
| 5,213,385 A | * | 5/1993 | Nagai | F16B 47/00 294/189 |
| 8,290,624 B2 | * | 10/2012 | Hjornet | B65B 35/18 414/737 |

(Continued)

FOREIGN PATENT DOCUMENTS

| | | |
|---|---|---|
| CN | 105905603 A | 8/2016 |
| CN | 109955233 A | 7/2019 |
| DE | 102 24 598 C1 | 7/2003 |

(Continued)

OTHER PUBLICATIONS

Korean patent KR 2016-0002650, published Jul. 29, 2016, with English translation. (Year: 2016).*

(Continued)

*Primary Examiner* — Dean J Kramer
(74) *Attorney, Agent, or Firm* — George McGuire

(57) ABSTRACT

The invention relates to a method for gripping an object by a handling system, including a robot with at least one robot arm, a gripping device which is connected to the robot arm and has a pneumatically operated suction gripper having an elastically deformable contact portion for contact with an outer surface of the object to be gripped, an identifier for identifying the outer surface of the object to be gripped and a controller which interacts with the identifier and is designed to control the robot.

8 Claims, 4 Drawing Sheets

(56) References Cited

U.S. PATENT DOCUMENTS

2019/0061174 A1  2/2019  Robinson et al.

FOREIGN PATENT DOCUMENTS

| DE | 10 2011 056 029 A1 | 6/2013 |
| DE | 10 2017 115 738 A1 | 1/2019 |
| EP | 2796263 A2 | 10/2014 |
| EP | 2 796 263 B1 | 10/2017 |

OTHER PUBLICATIONS

German Office Action, dated Jun. 25, 2020 pp. 1-7.
Non-Translated Chinese Office Communication, Application No. 202110041923.1, dated Feb. 1, 2023, pp. 1-11.

\* cited by examiner

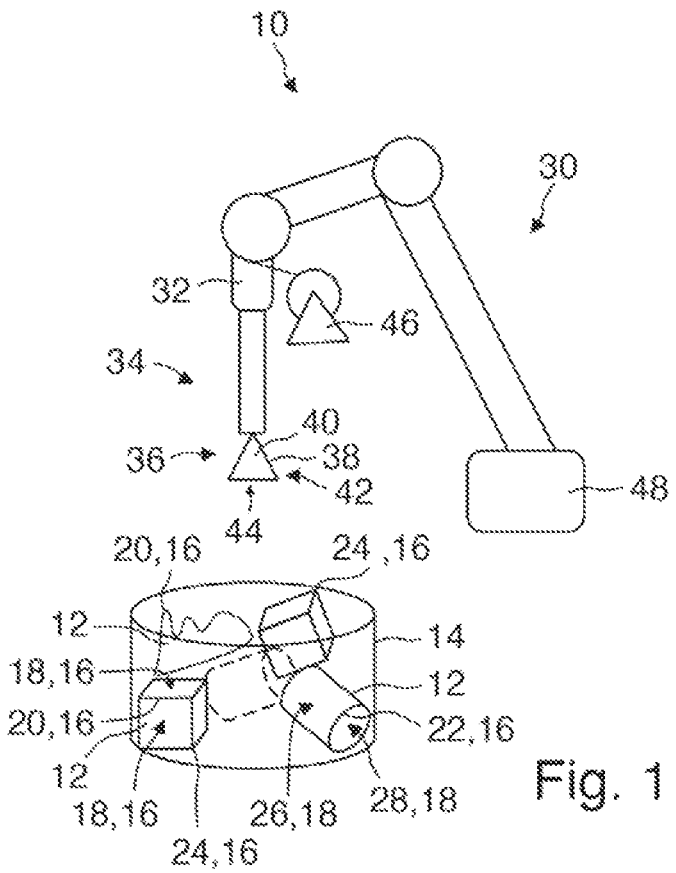
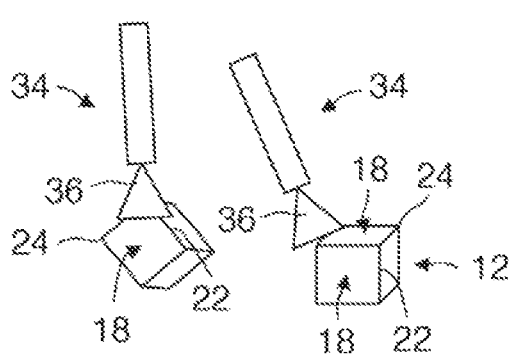 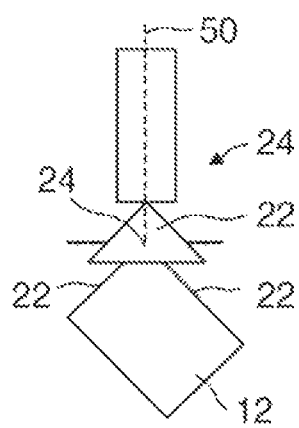
Fig. 2a      Fig. 2b

METHOD FOR GRIPPING AN OBJECT AND SUCTION GRIPPER

CROSS-REFERENCE TO RELATED APPLICATIONS

The present application relates and claims priority to German Patent Application No. 10 2020 100 568.7, filed Jan. 13, 2019, the entirety of which is hereby incorporated by reference.

BACKGROUND

The invention relates to a method for gripping an object and to a suction gripper for use in a method for gripping an object.

Such methods are used, for example, when picking goods in warehouses. A handling system is used here to selectively grip individual goods in a storage container and, after gripping, to move the object to another location. For this purpose, the handling system used usually comprises a robot with a robot arm and a gripping device connected to the robot arm. The gripping device is in particular a suction gripping device which comprises a pneumatically operated suction gripper having an elastically deformable contact portion for contact with an outer surface of the object to be gripped.

In a typical application situation, the storage container contains a large number of goods which also have different shapes, sizes and weights, for example. In particular, it is also conceivable that the objects lie in a disordered manner, i.e. with different orientations, in the storage container, and that the outer surface regions that are suitable for gripping of different objects are oriented differently. In the present context, "outer surface" denotes in particular the surface of an object which delimits the object to the outside, i.e. with respect to the surroundings of the object, and thus defines an outer shape of the object. The outer surface usually comprises planar portions and other portions, in particular convex or concave curved portions (e.g. convex elevations and/or outer edges and/or outer corners).

In order to grip an object, the suction gripper is usually moved toward planar portions of the outer surface (in particular flat portions of the outer surface) so that the contact portion of the suction gripper rests as flatly and sealingly as possible against the planar portion of the outer surface. By supplying negative pressure to the suction gripper, the object is then sucked up and gripped. It is also known, before the suction gripper approaches, to identify the outer surface of the object by means of an identification means and to select suitable planar portions of the outer surface.

The known methods have the problem that the suction gripper must be regularly and precisely adjusted to the size and/or shape of an object to be gripped in order to be able to reliably grip the object. For example, for effective sealing between the suction gripper and the object, it is in particular necessary for an opening cross section of a suction opening of the suction gripper to be selected to be smaller than an extension of the approached planar portion of the object. In practice, this means that the suction gripper has to be changed frequently in order to be able to grip objects of different sizes and/or properties, which has a negative effect on the productivity of the gripping process.

On this basis, the problem addressed by the present invention is that of being able to grip objects with a large variety of shapes and sizes in a simple manner, e.g. from a storage container in which the objects lie with different orientations.

SUMMARY OF THE INVENTION

This problem is solved by a method for gripping an object which comprises the steps according to claim 1.

An object is gripped according to the method by means of a handling system comprising a robot with at least one, preferably multi-articulated, robot arm and a gripping device connected to the robot arm. The gripping device comprises a pneumatically operated suction gripper, in particular operated with negative pressure, for sucking up an object. The suction gripper has a wall which extends away from a connection nipple and opens into an elastically deformable contact portion (in particular in the manner of a sealing-lip-like portion) for contact with an outer surface of an object to be gripped. The connection nipple is designed in particular to be connected to an external negative-pressure supply. The wall delimits a suction interior which is open in the direction of the object. The contact portion surrounds a suction opening in the suction interior.

The handling system further comprises an identification means for identifying an outer surface of the object to be gripped with in particular planar portions and/or convex elevations and/or outer edges and/or outer corners. The identification means can comprise, for example, a camera means which is designed to capture the outer surface of the object, in particular optically or visually.

The handling means further comprises a control means which interacts with the identification means and is designed to control the robot in particular on the basis of a signal from the identification means.

According to the method, an outer surface of an object to be gripped is first identified by means of the identification means of the handling system and a distinction is made between planar, in particular flat portions of the outer surface on the one hand and convex elevations or outer edges or corners of the outer surface of the object on the other. It is conceivable that the distinction takes place such that convex elevations or outer edges or outer corners are identified in a targeted manner, for example using suitable image processing methods. In particular, the position and location of the convex elevations or outer edges or outer corners is also identified.

In a next step, the suction gripper is then made to approach the outer surface of the object to be gripped in such a way that at least a part of the contact portion of the suction gripper clings to at least one convex elevation or outer edge of the outer surface. In this respect, the suction gripper is deliberately made to approach the outer surface of the object to be gripped in such a way that at least a part of the contact portion of the suction gripper is placed on a convex elevation or outer edge of the outer surface in a conformal manner. In particular, no attempt is made to place the suction gripper on a planar (in particular flat) portion of the outer surface and to place the contact portion as flatly as possible. Rather, an uneven placement of the contact portion is deliberately sought. For this purpose, a suction gripper is used of which the contact portion is designed in such a way that it can cling to a convex elevation or outer edge of the outer surface.

In particular, the present invention does not involve approaching the object in an indeterminate manner and compensating for possible unevenness in the outer surface by using an elastically deformable suction gripper. Rather, according to the method, convex elevations or outer edges are approached in a targeted manner, specifically in such a way that at least a part of the contact portion of the suction gripper clings to said convex elevation or outer edge in a targeted manner. Therefore, if possible, it is not only the planar portions of the outer surface of an object to be gripped which are approached. In particular, the convex elevations and/or outer edges, which have been distinguished from the planar portions of the outer surface of the object, are determined e.g. by computer before the suction gripper approaches.

In the present context, the terms "outer edge" or "outer corner" are to be understood as regions of the outer surface in which the outer surface as a whole is bulged or convex. In contrast to this, the terms "inner edge" or "inner corner" denote regions of the surface in which the surface as a whole is indented or concave. In the present context, a convex elevation denotes in particular a local projection region of the object in which the outer surface of the object is convexly curved toward the surroundings. In the present context, an outer edge denotes in particular a portion of the outer surface of the object in which two, in particular flat, planar portions with different orientations adjoin one another, in particular merge into one another. In particular, an outer edge is a portion of the outer surface of an object in which, viewed along a line, the slope of the outer surface changes in the direction of the line from positive to negative, preferably abruptly.

Such a method makes it possible to easily grip objects of different shapes and sizes with just one suction gripper, which is of great advantage, for example when picking goods having different properties. The fact that the suction gripper is made to approach convex elevations or outer edges in a targeted manner and clings thereto with its contact portion ensures effective sealing between the suction gripper and the object, in particular regardless of the extension of the planar portions of the outer surface of the object. In particular, the convex elevation or outer edge of the object can partially enter a suction interior of the suction gripper, so that the suction interior partially slips over the convex elevation. In particular, however, the contact portion of the suction gripper also clings around the convex elevation. As a result, high frictional forces are achieved in addition to a good sealing effect, providing a comparatively high holding force.

According to an advantageous embodiment of the method, the suction gripper is made to approach the outer surface of the object in such a way that the convex elevation or outer edge passes through the suction opening in the suction interior, in particular protrudes over an edge of the contact portion surrounding the suction opening. The contact portion can then cling particularly well to the outer surface of the object, which promotes sealing between the object and the suction gripper and thus reduces leakage. This allows an object to be gripped particularly reliably and securely. For example, it is conceivable that the suction gripper is made to approach one such outer edge of which the extension along the edge line is greater than an opening cross section of the suction opening.

In particular, the method can then include a selection step in which, from the convex elevations and/or outer edges which were distinguished from the planar portions of the outer surface, one such convex elevation or outer edge is selected (and then approached) of which the extension in at least one direction is larger than an opening cross section of the suction opening. For this purpose, a maximum diameter of the suction opening and/or a data set which describes the geometry of the suction opening can be stored in the identification means and/or in the control means.

Furthermore, it is also possible that the suction gripper is made to approach the outer surface of the object in such a way that at least a part of the contact portion of the suction gripper clings to one such convex elevation or outer edge at which the outer surface of the object is convexly curved in such a way that a radius of curvature of the outer surface falls below a predetermined threshold value. In this respect, in particular those regions are selected in which the outer surface has an edge that is sufficiently formed as a kink or has a "sharp" edge, distinguishing it from round elevations. The method can in particular include a selection step in which, from the convex elevations and/or outer edges of the outer surface which have been distinguished from the planar portions of the outer surface, one such convex elevation or outer edge is selected (and then approached) at which a radius of curvature of the outer surface falls below a predetermined threshold value. In particular, the threshold value is stored in the identification means and/or the control means. The threshold value is preferably predetermined on the basis of a geometry of the suction gripper, in particular on the basis of a maximum opening cross section of the suction opening. In particular, a threshold value is greater than zero and less than 100 mm, further in particular less than 50 mm, further in particular less than 10 mm, further in particular less than 5 mm, further in particular less than 1 mm.

In the presence of a plurality of convex elevations or outer edges, it may be the case, for example, that the convex elevation or outer edge at which a radius of curvature is minimal is approached in a targeted manner (as far as they are accessible).

It is particularly preferred if the convex elevation is formed by an outer corner of the object in which multiple outer edges converge in a star shape. In this respect, the suction gripper is in particular made to approach an outer corner of the object. The suction gripper is preferably made to approach the outer corner in such a way that the contact portion of the suction gripper clings to each of the outer edges which form the outer corner. In this respect, the suction gripper is in particular made to approach the outer corner in such a way that the contact region of the suction gripper slips over an outer corner. The outer corner of the object can then enter the interior of the suction gripper. In particular, the contact portion can then also cling to the planar portions of the outer surface which converge in the outer corner and are separated by the outer edges. A contact surface between the contact portion and the outer surface—and thus a sealing surface or friction surface—is particularly large when approaching an outer corner, which means a comparatively high holding force can be provided. It is conceivable for the outer edges to converge in the outer corner ("pointed" corner). It is also conceivable for the outer edges to converge, but not meet, and in particular to open out in a plane. In this respect, the outer corner can in particular be a rounded corner or a "blunt" corner, for example a chamfered corner.

When approaching an outer edge or outer corner, the suction gripper is preferably made to approach the outer surface of the object in such a way that at least a section of the approach path from a starting position of the suction gripper to a contact position of the suction gripper on the outer surface of the object, in particular the last section until the contact position is reached, extends in parallel with an edge normal of the outer edge or with a corner normal of the outer corner, in particular along the edge normal or corner normal. In the present context, edge normal (corner normal) refers in particular to a vector which results from the vector sum of the surface normals of the surfaces adjoining the outer edge (outer corner) and has its origin at the outer edge (outer corner). In other words, an edge normal denotes in particular the bisector of the surface normals of the adjoining surfaces with origin at the outer edge. In this respect, the suction gripper is made to approach the outer surface of the object in such a way that, at least along a section of the approach path, a plane spanned by the suction opening is oriented orthogonally to the edge normal (corner normal). The contact portion of the suction gripper can then cling symmetrically to the outer edge or outer corner, which promotes a particularly uniform seal and thus reliable gripping of the object.

In order to make it easier for the contact portion to cling to a convex elevation or outer edge or outer corner of the outer surface of an object, it can also be advantageous if the suction gripper is made to approach the outer surface of the object to be gripped in such a way that the suction gripper, in the course of its approach movement, travels on an orbital path, in particular a circular or elliptical or spiral path, around the edge normal of the outer edge or corner normal of the outer corner. Then, in the course of its approach movement, the suction gripper is moved in particular at least in portions on a circular path or elliptical path or spiral path around the edge normal of the outer edge or corner normal of the outer corner. In the present context, "spiral" denotes in particular a movement of the suction gripper in which the suction gripper is additionally moved toward to the object, in particular along the edge normal, during its orbital movement around the edge normal. When approaching outer edges, it is also conceivable for the suction gripper to be additionally or alternatively moved along an edge line of the outer edge.

It can also be advantageous for the suction gripper to be made to approach the outer surface of the object in such a way that the contact portion of the suction gripper clings to one such convex elevation or outer edge of the outer surface that separates at least two planar portions of the outer surface. In particular, the contact portion then also clings in portions to the flat portions which are separated by the convex elevation or outer edge. A contact surface of the contact portion is then particularly large, as a result of which effective sealing and high frictional forces are achieved. In this context, it is particularly advantageous if the suction gripper is made to approach one such convex elevation or outer edge or outer corner of the outer surface which directly adjoins at least two planar portions of the outer surface.

The problem stated at the outset is also solved by a suction gripper which is designed in particular for use in one of the methods described above.

The suction gripper comprises a connection nipple which is designed in particular to be connected to a negative-pressure supply. The suction gripper also has a wall which extends away from the connection nipple and opens into an elastically deformable contact portion for contact with an outer surface of an object to be gripped. The wall delimits a suction interior which is open in the direction of an object to be gripped and, in particular, can be supplied with negative pressure in order to suck up the object, i.e. to exert a holding force. A suction opening in the suction interior is delimited by the contact portion. The suction gripper is preferably made from a plastics material, in particular from polyurethane (PU) or nitrile rubber (NBR).

The suction gripper is designed in such a way that the wall widens in the manner of a funnel in the direction of the suction opening, i.e. in the path along the extension of the wall from the connection nipple to the suction opening. In this respect, the suction gripper is in particular designed such that an opening cross section of the suction interior increases, preferably steadily, in the path from the connection nipple to the contact portion. Such a suction gripper can therefore cling particularly well to convex elevations on an outer surface, in particular to outer corners.

The wall is designed in such a way that a material thickness of the wall is reduced along the path in the direction from the connection nipple to the suction opening, i.e. in the direction of the contact portion. Preferably, a material thickness of the wall decreases without bending, in particular linearly.

In such a suction gripper, the wall in the region of the contact portion is comparatively thin and therefore flexible, while the wall in a wall portion adjacent to the connection nipple is thicker and therefore comparatively stiff. When used in a method explained above, the flexible contact portion of such a suction gripper can therefore cling particularly well to the outer surface of an object to be gripped and can in particular follow the course of convex elevations or outer edges or corners of the outer surface; at the same time, the wall portions with greater material thickness ensure adequate dimensional stability of the suction gripper.

In particular, with a suction gripper designed in this way, it is possible for the wall to implode selectively in the regions of low material thickness, in particular in the region of the contact portion, when the suction interior is supplied with negative pressure (i.e. the suction interior contracts radially inward as it reduces in size). In this case, the contact portion is pressed against the outer surface of the object, so that it can cling to the outer surface in a surface-to-surface manner, in particular in a conformal manner. This promotes sealing. In addition, high frictional forces are achieved. Furthermore, the implosion of the suction gripper exerts a mechanical clamping force on the object to be gripped, so that the object can be gripped securely.

At the same time, however, the wall that becomes thicker and therefore stiffer in the direction from the contact portion to the connection nipple prevents the wall from imploding over its entire extension from the connection nipple to the contact portion. This makes it possible to ensure that the suction interior remains open at least in portions and the object can be sucked up with a minimum volume flow. Overall, a high holding force can be achieved in this way.

In order to further increase the holding force, it is also advantageous for the suction gripper to have one or more friction structures on an inner side of its wall facing the suction interior in order to increase a frictional effect between the wall and the outer surface of an object to be gripped. In particular, the friction structure is arranged in the region of the contact portion.

Furthermore, it can be advantageous if the suction gripper is designed in such a way that the wall implodes only when the wall is in contact with the outer surface of the object to be gripped with a predetermined area percentage of its inner side. This area percentage is preferably at least 10% and at most 70% of the total area of the inner side of the wall. It is also conceivable that the suction gripper is designed in such a way that the wall implodes only when a predetermined volume fraction of the suction interior is filled by the object.

Even if, according to the present method, it is not the planar portions of an outer surface that are to be approached, but rather convex elevations or outer edges or outer corners in a targeted manner, it is in principle still possible to also grip objects on a planar portion of the outer surface using such a suction gripper. Due to the fact that the suction gripper is flexibly deformable in the region of the contact portion, the contact portion can turn inside out in the manner of a sombrero in particular when it strikes a planar portion and can in this way form a sealing lip for contact with the planar portion.

It is possible for the wall of the suction gripper to extend rotationally symmetrically about a central axis, in particular to widen conically in the direction of the suction opening. A suction opening is then designed to be circular. It is also possible that the wall does not extend rotationally symmetrically about a central axis. This makes it possible to specify a preferred direction for imploding. For example, the wall can be designed such that a suction opening is oval.

In order to further reduce the risk of complete implosion of the suction gripper, it can also be advantageous for the suction gripper to have one or more reinforcing structures on an inner side of its wall facing the suction interior. In particular, the reinforcing structures are designed in the form of ribs and/or webs and/or elevations protruding into the suction interior. The reinforcing structures preferably extend only over a part of the extension of the wall from the connection nipple to the contact portion, in particular along a wall portion which adjoins the connection nipple. The reinforcing structures stiffen the wall in this wall portion and prevent the wall in this wall portion from completely imploding when negative pressure is supplied to the suction interior. In particular, the reinforcing structures are designed and arranged in such a way that, when the suction gripper implodes, they interact in such a way that a fluid channel from the connection nipple of the suction gripper to the outer surface of a gripped object remains open so that the object can still be sucked up. It is conceivable for the reinforcing structures to be formed by an insert provided separately from the wall, which insert can be or is arranged on the inner side of the wall. It is also conceivable that the reinforcing structures are formed in one piece with the wall of the suction gripper.

Furthermore, it can be advantageous if the suction gripper has a bellows, in particular a folding gaiter. Then, in a particularly simple manner, the contact portion can also cling to those portions of the outer surface of an object that are inclined to an approach direction of the suction gripper. In particular, such a bellows or sylphon bellows is arranged between the connection nipple and the portion of the wall of the suction gripper extending in the manner of a funnel.

The problem stated at the outset is also solved by using a suction gripper described above in a method described above.

BRIEF DESCRIPTION OF THE DRAWINGS

The invention will be explained in more detail in the following with reference to the drawings.

In the drawings:

FIG. 1 schematically shows a handling system for gripping objects;

FIG. 2a, b are schematic views for illustrating an embodiment of the method;

DETAILED DESCRIPTION

Figure 3:
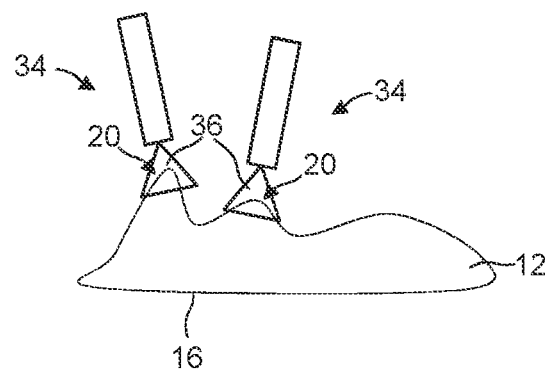
FIG. 3 is a schematic view for illustrating an embodiment of the method.

In the following description and in the drawings, the same reference signs are used for identical or corresponding features.

FIG. 1 schematically shows a handling system 10 by means of which an embodiment of the method for gripping an object 12 is to be explained by way of example. The method can be used to selectively grip objects 12 from a container 14 having a plurality of objects 12, for example. It goes without saying that the method can also be carried out by means of corresponding handling systems 10 of which the embodiment deviates in details from the embodiment shown in FIG. 1.

In general, an object 12 has an outer surface 16 which delimits the object 12 to the outside, i.e. toward the surroundings of the object 12. Such an outer surface 16 usually has planar portions 18 and, arranged therebetween, convex elevations 20 and/or outer edges 22 and/or outer corners 24. As can be seen from FIG. 1, an outer surface 16 of cuboid objects 12, for example, usually has flat portions 18, with two planar portions 18 converging in an outer edge 22 in each case. The outer edges 22 then converge in outer corners 24 in a star shape. Thus, three planar portions 18 converge in the outer corners 24. In the case of cylindrical objects 12, the outer surface 16 generally has planar regions 18 in the form of a lateral surface 26 and a top surface or bottom surface 28, which merge into one another at an outer edge 22. It is also possible, for example, for objects 12 to have an irregular outer surface 16 with convex elevations 20, i.e. local projection regions in which the outer surface 16 is convexly curved toward the surroundings of the object 12. The objects 12 shown in FIG. 1 serve merely as examples to explain the method. It goes without saying, however, that the method is not limited to gripping objects 12 of this kind.

The handling system 10 comprises a robot 30 with a multi-articulated robot arm 32 and a gripping device 34 arranged on the robot arm 32.

The gripping device 34 comprises a pneumatically operated suction gripper 36 for sucking up the object 12. The suction gripper 36 has a wall 38 which delimits a suction interior 40 and which, at an end facing the object 12, opens into an elastically deformable contact portion 42 for contact with the outer surface 16 of an object 12 to be gripped. The contact portion 42 delimits a suction opening 44 in the suction interior 40. A preferred embodiment of a suction gripper 36 is explained in detail below with reference to FIGS. 4 to 8.

The handling system 10 further comprises an identification means 46 for identifying the outer surface 16 of an object 12 to be gripped. By way of example and preferably, the identification means 46 comprises a camera means which is designed to capture the outer surface 16 of the object 12 to be gripped and to differentiate between planar portions 18 on the one hand and convex elevations 20 or outer edges 22 or outer corners 24 provided therebetween on the other.

The handling system 10 further comprises a control means 48 which interacts with the identification means 46 and is designed to control the robot 30.

In the following, an embodiment of the method for gripping an object 12 by means of such a handling system 10 is explained with reference to FIGS. 1 to 3.

According to the method, an outer surface 16 of the object 12 to be gripped is first identified by the identification means 46 and a distinction is made between planar portions 18 of the outer surface 16 on the one hand and convex elevations 20 or outer edges 22 or outer corners 24 of the outer surface 16 on the other. By way of example and preferably, the position and location of convex elevations 20 or outer edges 22 or outer corners 24 is determined using a computer.

The robot 30 is then controlled by means of the control means 48 in such a way that the robot 30 makes the suction gripper 36 approach the outer surface 16 of the object 12 to be gripped in such a way that the contact portion 42 of the suction gripper 36 clings to a convex elevation 20 or outer edge 22 or outer corner 24 of the outer surface 16. In this respect, the suction gripper 36 is made to approach the object 12 in such a way that the contact portion 42 rests at least in portions against a convex elevation 20 or outer edge 22 or outer corner 24 of the outer surface 16 of the object 12 in a conformal manner. According to the method, it is not the planar portions 18 of the outer surface 16 that are approached, but rather the convex elevations 20 or outer edges 22 or outer corners 24.

By way of example, FIGS. 2a and 2b illustrate an embodiment of the method in which an outer corner 24 of an object 12 is approached. As can be seen from FIG. 2b, the suction gripper 36 is in particular made to approach the outer corner 24 in such a way that the contact portion 42 surrounds the outer corner 24. In the process, the outer corner 24 of the object 12 at least partially enters the suction interior 40 of the suction gripper 36 (cf. FIG. 2b). In contact with the outer surface 16 of the object 12, the contact portion 42 of the suction gripper 36 clings both to the outer edges 22, which converge in the outer corner 24, and also to the planar portions 18 of the outer surface 16 separated from the outer edges 22.

As shown schematically in FIG. 2b, the suction gripper 36 is preferably made to approach the outer corner 24 along a corner normal 50 (or along an edge normal when approaching an outer edge 22). However, it is also possible for the suction gripper 36 to be made to approach the outer corner 24 in an approach direction inclined to the corner normal 50 (edge normal) (cf. FIG. 2a, right-hand illustration). Furthermore, it is possible for the suction gripper 36 to follow an in particular circular or elliptical or spiral orbital path around the corner normal 50 of the outer corner 24 (or the edge normal of the outer edge 22) in the course of its approach movement to the outer surface 16.

By way of example, FIG. 3 illustrates an embodiment of the method in which the suction gripper 36 is made to approach a local convex elevation 20 of an object 12 with an irregularly shaped outer surface 16. In this case, preferably one such convex elevation 20 is approached at which the outer surface 16 is curved in such a way that the object 12 can partially enter the suction interior 40 of the suction gripper 36.

A preferred embodiment of a suction gripper 36 is explained in detail below with reference to FIG. 4.

Figure 4:
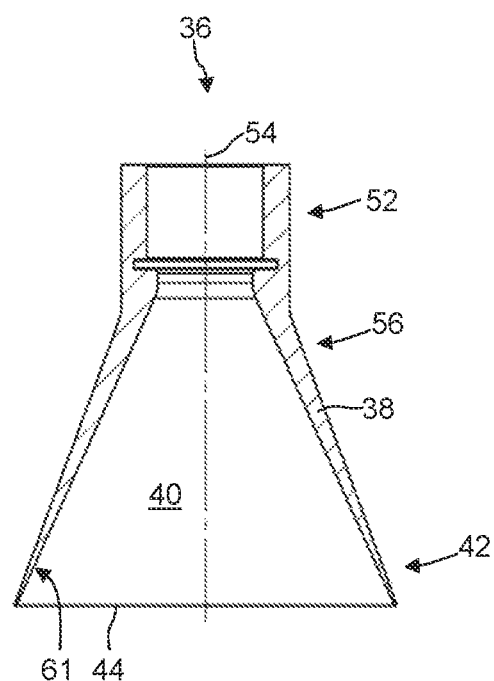
FIG. 4 is an outline of a first embodiment of a suction gripper in a vertical section.

The suction gripper 36 comprises a connection nipple 52 for connection to an external negative-pressure supply (not shown) and extends with a wall 38 along a central axis 54 from the connection nipple 52 to a contact portion 42 for contact with the outer surface 16 of an object 12 to be gripped (not shown in FIG. 4). The wall 38 delimits a suction interior 40 which is open through a suction opening 44 and can be supplied with negative pressure via the connection nipple 52. The suction opening 44 is surrounded by the contact portion 42.

As can be seen from FIG. 4, the wall 38 widens in the manner of a funnel in the direction of the suction opening 44. In this respect, an opening cross section of the suction interior 40 increases in the path from the connection nipple 52 to the contact portion 42. For example, the wall 38 extends rotationally symmetrically, in particular conically, about the central axis 54. In embodiments that are not shown, however, it is also possible that the wall 38 does not extend rotationally symmetrically about the central axis 54, for example in such a way that a suction opening 44 is oval.

The wall 38 is designed in such a way that a material thickness of the wall 38 is reduced along the path in the direction from the connection nipple 52 to the suction opening 44, i.e. in the direction of the contact portion 42. By way of example and preferably, a material thickness decreases without bending, in particular linearly. In this respect, a material thickness in the region of the contact portion 42 is comparatively small, while a material thickness in a wall portion 56 adjacent to the connection nipple 52 is comparatively thick.

Figure 5A:
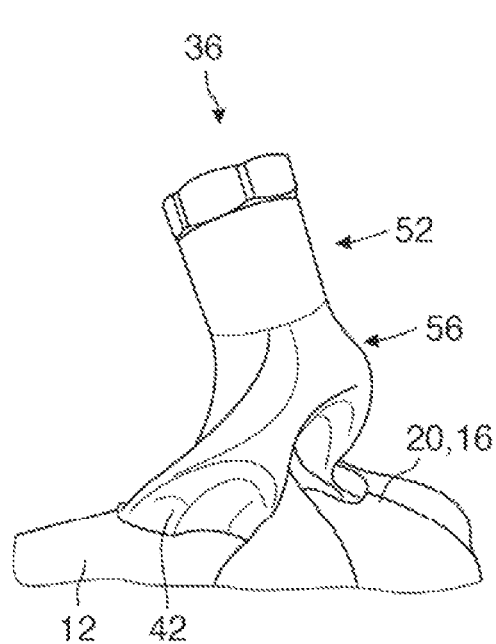
FIG. 5a, b are photographs of a suction gripper, the contact portion of which clings to a plurality of convex elevations or outer edges of an object.
Figure 5B:
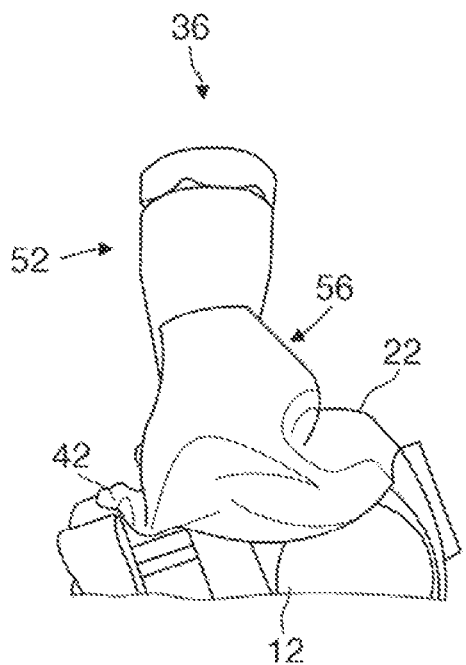

A use of such a suction gripper 36 in a method described above is explained below with reference to FIGS. 5a and 5b. FIGS. 5a and 5b show photographs of a suction gripper 36 described above in a gripping configuration in which negative pressure is supplied to the suction gripper 36 and the contact portion 42 of said gripper rests sealingly against the outer surface 16 of a gripped object 12. As can be seen from FIGS. 5a and 5b, the wall 38 is selectively contracted (imploded) radially inward in the region of the contact portion 42 due to the supply of negative pressure to the suction interior 40. In this case, the contact portion 42 is pressed against the outer surface 16 of the object 12 so that it rests in a surface-to-surface manner against the outer surface 16. The contact portion 42 follows a course of the outer surface 16 and clings in a sealing manner to convex elevations 20, outer edges 22 and/or outer corners 24 of the outer surface 16. In the wall portion 56 with greater material thickness adjacent to the connection nipple 52, however, the wall 38 is not imploded, so that a fluid channel from the connection nipple 52 to the outer surface 16 of the object 12 is open and the object can be sucked up (cf. in particular FIG. 5b).

For example, the suction gripper 36 can be designed in such a way that the wall 38 in the region of the contact portion 42 implodes only when an object 12 to be gripped has entered the suction interior 40 in such a way that a predetermined volume fraction of the suction interior 40 is filled by the object 12 and/or when the wall 38 is in contact with the outer surface 16 of the object 12 to be gripped with a predetermined area percentage of its inner side 58.

Figure 6:
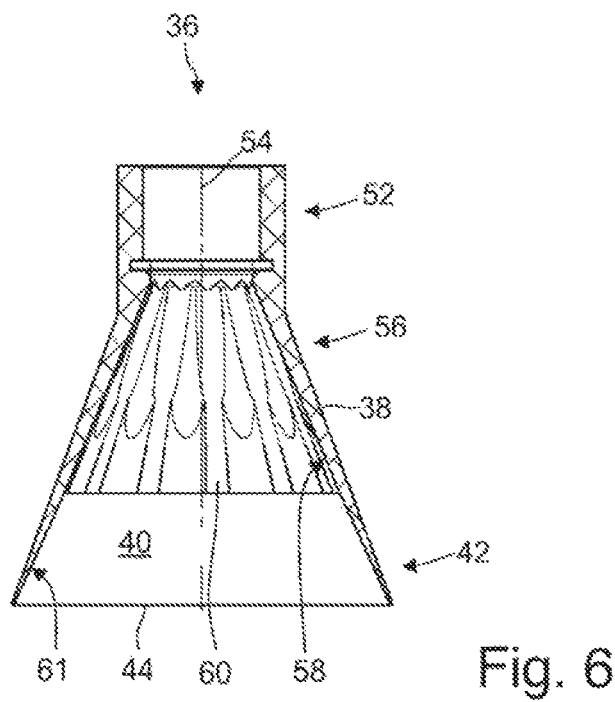
FIG. 6 is an outline of a second embodiment of a suction gripper in a vertical section.

In order to further reduce the risk of complete implosion of the suction gripper 36, the suction gripper 36 can have, on an inner side 58 of its wall 38 facing the suction interior 40, a plurality of reinforcing structures 60 in the form of ribs which protrude into the suction interior 40 (cf. FIG. 6). As can be seen from FIG. 6, the ribs 60 extend, by way of example and preferably, away from the connection nipple 52 only over a part of the extension of the wall 38 (wall portion 56). By way of example and preferably, the reinforcing structures 60 are arranged so as to be distributed along a circumference around the central axis 54. The reinforcing structures 60 stiffen the wall 38 in the wall portion 56 and thus prevent the suction gripper 36 from imploding in this wall portion 56 when negative pressure is supplied to the suction interior 40. In particular, the reinforcing structures 60 are designed in such a way that, upon imploding, they collide in such a way that a fluid channel from the connection nipple 52 to the outer surface 16 of a gripped object 12 remains open.

The suction gripper 36 can optionally have one or more friction structures 61 on the inner side 58 of its wall 38 in the region of the contact portion 42 in order to increase a frictional force between the wall 38 and the outer surface 16 of an object 12 to be gripped (cf. FIGS. 4 and 6).

Figure 7:
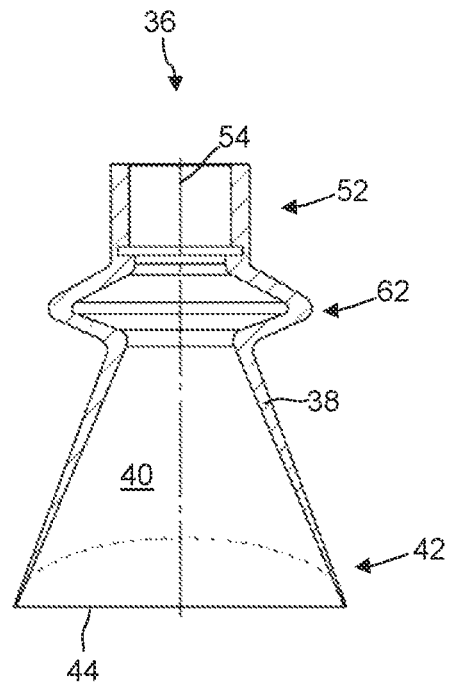
FIG. 7 is an outline of a third embodiment of a suction gripper in a vertical section.
Figure 8:
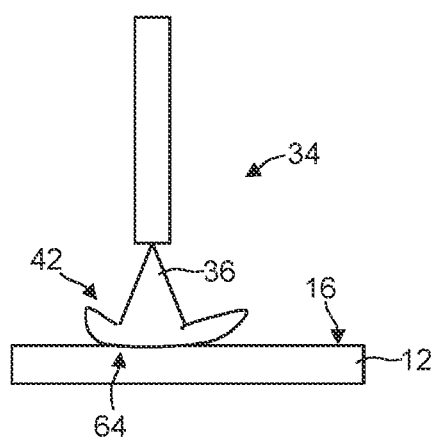
FIG. 8 schematically shows a suction gripper when approaching a planar portion of the outer surface of an object.

Alternatively or additionally, the suction gripper 36 can have a bellows 62 which is arranged in particular between the connection nipple 52 and the funnel-shaped wall 38 (cf. FIG. 7).

Even though the method described above is aimed at approaching convex elevations 20 or outer edges 20 or outer corners 22 of an object 12 in a targeted manner, it is in principle also possible to exclusively grip an object 12 on a planar portion 18 of its outer surface 16 with such a suction gripper 36. As shown schematically in FIG. 8, the flexible contact portion 42 can turn inside out in the manner of a sombrero on contact with a planar portion 18 of an outer surface 18, thus forming a sealing lip 64 for contact with the planar portion 18 of the outer surface 16. For this purpose, it is preferred if the suction gripper 36 is made to approach the outer surface 16 at a comparatively high speed.

What is claimed is:

1. A method for gripping an object by means of a handling system-, comprising:
    (a) a robot with at least one robot arm;
    (b) a gripping device connected to the robot arm, comprising a pneumatically operated suction gripper having a wall which extends away from a connection nipple and opens into an elastically deformable contact portion for contacting an outer surface of an object to be gripped, the wall delimiting a suction interior, the contact portion delimiting a suction opening of the suction interior;
    (c) an identification means for identifying an outer surface of an object to be gripped;
    a control means which interacts with the identification means {-6} and is designed to control the robot;
the method comprising the following steps:
    (a) identifying an outer surface of an object to be gripped;
    (b) distinguishing between planar portions of the outer surface on the one hand and convex elevations or outer edges on the other;
    (c) making the suction gripper approach the outer surface of the object to be gripped by means of the robot;
wherein, the suction gripper is made to approach the outer surface of the object to be gripped in such a way that at least a part of the contact portion of the suction gripper clings to a convex elevation or outer edge of the outer surface.

2. The method according to claim 1, wherein the suction gripper is made to approach the outer surface of the object in such a way that the convex elevation or outer edge stretches across the suction opening.

3. The method according to claim 1, wherein the suction gripper is made to approach one such convex elevation or outer edge at which a radius of curvature of the outer surface is below a predetermined threshold value.

4. The method according to claim 1, wherein the suction gripper is made to approach the outer surface of the object in such a way that the contact portion of the suction gripper clings to a plurality of outer edges which converge in a star shape.

5. The method according to claim 1, wherein the suction gripper is made to approach the outer surface of the object in such a way that at least a section of the approach path extends in parallel with an edge normal of the outer edge.

6. The method according to claim 1, wherein the suction gripper is made to approach the outer surface of the object to be gripped in such a way that the suction gripper travels in one of a circular or elliptical or spiral orbital path around an edge normal of the outer edge.

7. The method according to claim 1, wherein the suction gripper is made to approach one such convex elevation or outer edge of the outer surface which separates at least two planar portions of the outer surface from one another.

8. A handling system, comprising:
    a. a robot with at least one robot arm;
    b. a gripping device connected to the robot arm, comprising a pneumatically operated suction gripper having a wall which extends away from a connection nipple and opens into an elastically deformable contact portion for contacting an outer surface of an object to be gripped, the wall delimiting a suction interior, the contact portion delimiting a suction opening of the suction interior;
    c. an identification means for identifying an outer surface of an object to be gripped;
    d. a control means which interacts with the identification means and is designed to control the robot;
    e. wherein the identification means and the control means comprise instructions that when executed cause the identification means and control means to perform the following:
        i. identifying an outer surface of an object to be gripped;
        ii. distinguishing between planar portions of the outer surface on the one hand and convex elevations or outer edges on the other; and
        iii. making the suction gripper approach the outer surface of the object to be gripped by means of the robot;
    f. wherein, the suction gripper is made to approach the outer surface of the object to be gripped in such a way that at least a part of the contact portion of the suction gripper clings to a convex elevation or outer edge of the outer surface.

* * * * *